though in some instances I have used the term "valves." The main valves and the secondary valves together constitute a pair of valves.

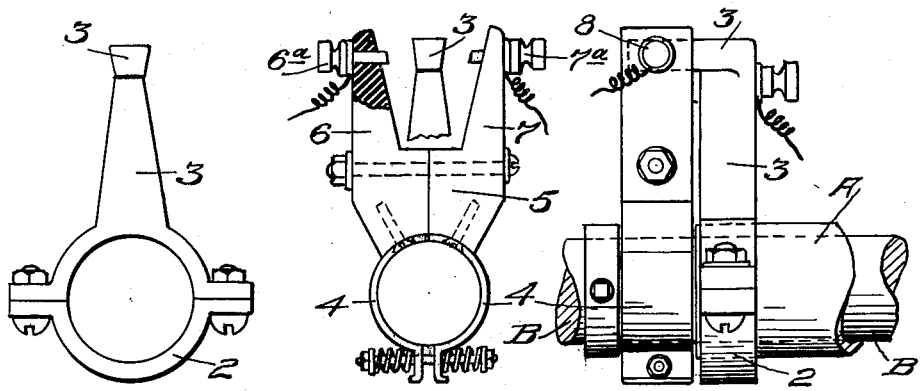
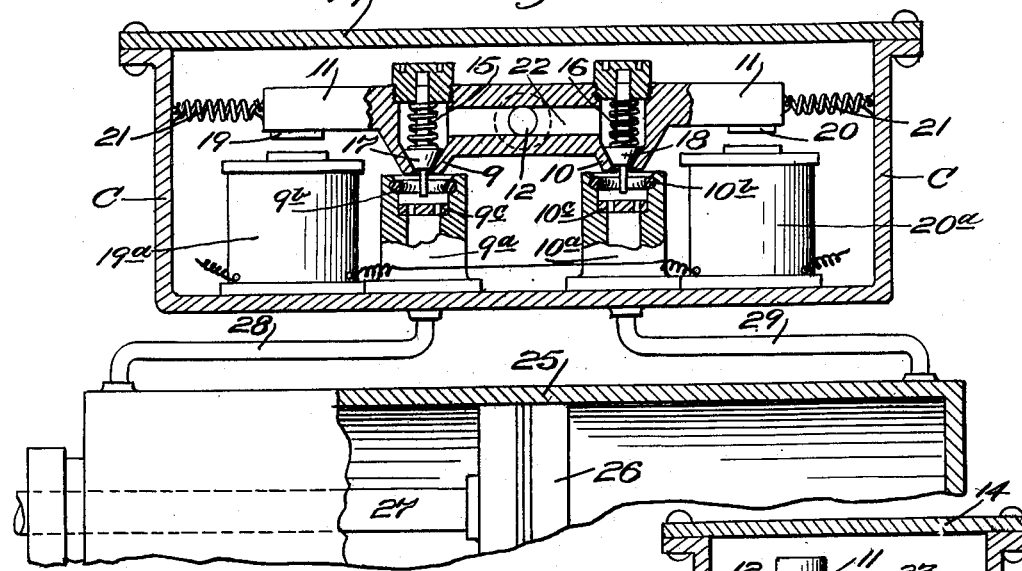
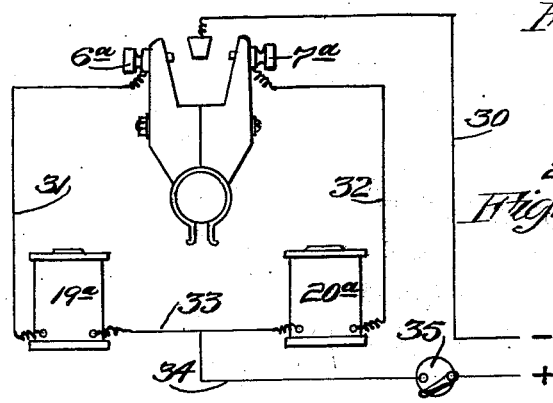
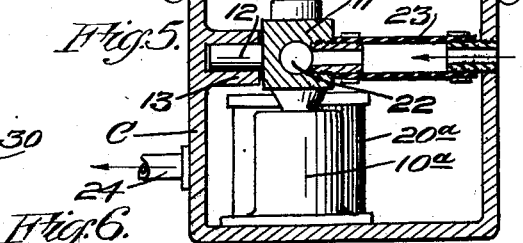

United States Patent Office 2,700,374
Patented Jan. 25, 1955

2,700,374

ELECTRICALLY ACTUATED VALVE MECHANISM FOR POWER STEERING

Jacob Jacobsen, Newark, Calif.

Application February 6, 1953, Serial No. 335,497

3 Claims. (Cl. 121—46.5)

This invention relates to a control mechanism for power steering of automotive vehicles and the like, and especially to a mechanism which is electrically actuated.

In the operation of automotive vehicles such as automobiles, busses, trucks and tractors, and the like, it has become more or less common practice to provide a power operated device or booster for applying power to supplement the effort required to steer such vehicles; the power operated device being generally a fluid pressure actuated cylinder and piston with means for transferring power from the piston to the steering mechanism. Such power operated devices require admission and exhaust of a fluid under pressure from opposite ends of the cylinder and means operated by rotation of the steering wheel for actuating valves which control admission and exhaust of the fluid.

The object of the present invention is generally to improve and simplify the construction and operation of a control mechanism actuated by the steering wheel of a vehicle; to provide a control mechanism whereby a pair of valves are automatically opened or closed to admit and exhaust a fluid from opposite ends of a cylinder, so as to move a piston mounted in the cylinder in one direction or another; to provide a control mechanism of the character described which is electrically actuated; to provide a control mechanism of such simplicity and minimum of parts that it may be readily applied to automotive vehicles and the like not previously equipped with power steering; and further to provide a control mechanism for power steering which may be instantly changed from hand to power steering or vice versa at the discretion of the operator.

The invention is shown by way of illustration in the accompanying drawings in which, Fig. 1 is an end view of the stationary terminal member.

Fig. 2 is an end view of the forked member and the contacts carried thereby, said view wbeing partially in section and also showing a portion of the stationary terminal.

Fig. 3 is a side elevation showing the stationary terminal and the forked member which carries the contacts.

Fig. 4 is a longitudinal vertical section of the sealed housing which carries the valves and their actuating mechanism, said view also diagrammatically showing a cylinder and piston actuated by the valves.

Fig. 5 is a cross section of Fig. 4, said section being taken at the pivotal point of the arm 11, and Fig. 6 is a wiring diagram showing how the terminal member and the contacts are connected with the electromagnets and the source of electric supply.

Referring to the drawings in detail and especially Figs. 1, 2 and 3, A indicates the stationary steering column of an automobile or like vehicle and B the shaft which is rotated by the steering wheel. Rigidly secured to the steering column by means of a clamp 2 is a terminal arm 3, and embracing the shaft B and frictionally secured thereto by means of a pair of spring-actuated arms 4—4 is a member 5 provided with forked arms 6 and 7. Member 5 and its arms are constructed of insulating material and carry terminal contacts 6ª and 7ª which will hereinafter be further described.

Figs. 4 and 5 illustrate a valve mechanism and a means for electrically opening and closing the valves. Four valves are employed, two main valves and two co-operating secondary valves. The main valves are indicated at 9 and 10 and are mounted on an arm 11 which is pivoted as at 12 and supported in a bearing 13 forming a part of a housing C closed and sealed by a cover 14. Cooperating with the main valves 9 and 10 are valve housings 9ª and 10ª and formed at the upper ends of the valve housings are rubber ring-shaped seat members 9ᵇ and 10ᵇ. Also carried by the valve housings are perforated plates 9ᶜ and 10ᶜ, the purpose of which will hereinafter be described.

Formed within each main valve is a valve seat and normally held in engagement with said seats by means of spring 15 and 16 are a pair of secondary valves 17 and 18 each having a stem extending downwardly to engage one of the perforated plates 9ᶜ or 10ᶜ. Secured to the arm 11 is a pair of armature plates 19 and 20 and aligning therewith are electromagnets 19ª and 20ª. Also secured to the arm are a pair of springs 21 which normally maintains the arm 11 in a horizontal position. Arm 11 has a passage 22 formed therein which connects with the secondary valves 17 and 18, the passage also connects with a flexible tube 23 which admits air under atmospheric pressure as will hereinafter be described.

The housing C encloses the arm 11 the valves carried and actuated thereby and also the electromagnets, and as it is closed and sealed by the cover 14 a vacuum may be maintained therein; such vacuum being maintained by tube 24 which may be connected with a vacuum pump or the intake manifold of an internal combustion engine, not shown.

In most instances where power steering is employed whether it be on boats or automotive vehicles, a cylinder such as diagrammatically indicated at 25, see Fig. 4 is employed. A piston 26 mounted therein is moved back and forth by a fluid under pressure, and the power of the piston is transmitted by the piston rod 27 in any suitable manner to the steering mechanism, and as it is necessary to admit fluid under pressure at one end and to exhaust fluid from the opposite end of the cylinder or vice versa two pipes or ducts 28 and 29 are employed and these are connected with the respective main valve housings 9ª and 10ª.

In actual practice, let it be assumed that the mechanism is applied to automotive vehicles for the purpose of supplementing or supplying the power required to turn the steering wheels. In that case, the terminal 3, see Fig. 6 may be connected by wire 30 either to ground or to the negative side of a battery or other source of electric current supply. Contact 6ª is connected by wire 31 with magnet 19ª and contact 7ª by wire 32 with magnet 28; the other terminals of the magnets being connected by wires 33 and 34 with the positive side where a switch 35 is interposed.

The operation is as follows: when the steering wheel, not shown is rotated, shaft B will rotate therewith and one or the other of the contacts 6ª or 7ª will engage the terminal 3 as the member 5 which carries the contacts is frictionally secured to shaft B and will accordingly rotate therewith until one of the contacts engages the terminal. A circuit is thus closed through one or the other of the magnets 19ª or 20ª. If magnet 20ª is energized the armature 20 will be attracted and arm 11 will swing about its pivot causing lowering of that end of the arm and raising of the other, thus the main valve 10 will close with relation to its seat 10ᵇ and at the same time the stem of the secondary valve 18 will engage the perforated plate 10ᶜ causing valve 18 to open and thereby permit atmospheric air to flow through tube 23, passage 22, valve 18, valve housing 10ª and pipe 29 from where it will enter the cylinder 25. The main valve housing 9ª is open as its valve 9 is raised with relation to its seat 9ᵇ and as a vacuum is maintained within the housing C air in the opposite end of the cylinder will be withdrawn through the pipe 28 thus causing the piston 26 to move toward the left. Vice versa, if magnet 9ᵇ is energized arm 11 will be rocked or tilted in the opposite direction causing valve 9 to close and valve 17 to open, thus air will be admitted to the left-hand end of the cylinder and vacuum will be applied to the opposite end, thereby causing the piston to travel in a right-hand direction. The piston will continue its travel in one direction or another as long as shaft B is being rotated by the steering wheel and movement will stop the moment rotation of shaft B is reversed as the contacts 6ª and 7ª will at that instant move out of engagement with the terminal arm 3, thus breaking the circuit through whichever magnet was last energized, arm 11 thus released will return to horizontal position due to the springs attached to its opposite ends, and both main valves will be open and both of the secondary valves will be closed. Vacuum is then applied to both ends of the piston and no power will be transmitted. The application of power to the steering wheel is most essential when turning out from a curb, or in other words, when the vehicle has little or no momentum; on the other hand, when the vehicle is under way, power steering may not be necessary and in this case, may be disconnected by merely opening the switch 35, thus rendering the control mechanism inoperative, in other words, power steering may be thrown into or out of operation by the mere closing or opening of the switch 35 which will be conveniently positioned within reach of the driver.

In Figs 1, 2 and 3 the terminal member 3 has been described as the stationary member and the member 5 as the frictionally secured member. Members 3 and 5 may be reversed, that is the member 3 may be frictionally secured to shaft B while the member 5 may be stationary and rigidly secured to the steering column A. I further wish it understood that similar changes may be resorted to within the scope of the appended claims.

Having thus described my invention, what I desire to claim and secure by Letters Patent is,

1. In a control device of the character described a pair of main valve housings each having a valve seat at one end, a pivotly mounted arm, a pair of main valves on said arm movable to and away from the valve seats of the main valve housings, a valve seat within each main valve, a pair of secondary valves carried by the pivoted arm and engageable with the valve seats within the main valves, a stem on each secondary valve and projecting through the valve seats of the main valve housings, means for imparting a rocking movement to the pivoted arm to cause one or another of the main valves to engage their respective valve seats, and means in each main valve housing for engaging the stem of a secondary valve to open the same.

2. In a control device of the character described, a pair of main valve housings each having a valve seat at one end, a pivotly mounted arm, a pair of main valves on said arm movable to and away from the valve seats of the main valve housings, a valve seat within each main valve, a pair of secondary valves carried by the pivoted arm and engageable with the valve seats within the main valves, a stem on each secondary valve and projecting through the valve seats of the main valve housings, electromagnets for imparting a rocking movement to the pivoted arm to cause one or another of the main valves to engage their respective valve seats, means in each main valve housing for engaging the stem of a secondary valve to open the same, a housing enclosing the pivoted arm the valves carried and actuated thereby and the electromagnets, a cover on said housing closing and sealing the same, means for maintaining a vacuum in said housing, and means for admitting air under pressure to the secondary valves.

3. In a control device of the character described, a pair of main valve housings each having a valve seat at one end, a pivotly mounted arm, a pair of main valves on said arm movable to and away from the valve seats of the main valve housings, a valve seat within each main valve, a pair of secondary valves carried by the pivoted arm and engageable with the valve seats within the main valves, a stem on each secondary valve and projecting through the valve seats of the main valve housings, means for imparting a rocking movement to the pivoted arm to cause one or another of the main valves to engage their respective valve seats, means in each main valve housing for engaging the stem of a secondary valve to open the same, an armature member at each end of the arm, an electromagnet aligned with each armature member, and means for closing an electric circuit through either electromagnet to impart a rocking movement to the pivotally mounted arm.

References Cited in the file of this patent

UNITED STATES PATENTS

| Number | Name | Date |
|---|---|---|
| 1,431,413 | Myers | Oct. 10, 1922 |
| 1,577,908 | Hynes | Mar. 23, 1926 |
| 1,645,751 | Graffinberger | Oct. 18, 1927 |
| 2,208,421 | Hanna | July 16, 1940 |

FOREIGN PATENTS

| Number | Country | Date |
|---|---|---|
| 370,665 | France | Jan. 3, 1907 |
| 624,978 | France | Apr. 16, 1927 |
| 711,002 | France | June 16, 1931 |
| 747,960 | France | Dec. 22, 1932 |